(12) United States Patent
Valenzuela et al.

(10) Patent No.: US 9,266,624 B2
(45) Date of Patent: Feb. 23, 2016

(54) SYSTEMS AND METHODS FOR MOVEMENT OF OBJECTS

(71) Applicant: The Boeing Company, Chiacgo, IL (US)

(72) Inventors: Dario Valenzuela, Everett, WA (US); Eric Reid, Everett, WA (US); Steven Best, Everett, WA (US); Matthew Desjardien, Everett, WA (US); Samuel Chew, Everett, WA (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 14/189,828

(22) Filed: Feb. 25, 2014

(65) Prior Publication Data

US 2015/0239580 A1 Aug. 27, 2015

(51) Int. Cl.
| | |
|---|---|
| *B64F 5/00* | (2006.01) |
| *B66F 9/06* | (2006.01) |
| *B66F 9/075* | (2006.01) |
| *G05D 1/02* | (2006.01) |
| *G05B 19/418* | (2006.01) |
| *B23Q 3/18* | (2006.01) |

(52) U.S. Cl.
CPC ............. *B64F 5/0036* (2013.01); *B64F 5/0009* (2013.01); *B66F 9/063* (2013.01); *B66F 9/0755* (2013.01); *B66F 9/07572* (2013.01); *G05B 19/41895* (2013.01); *G05D 1/0291* (2013.01); *B23Q 3/186* (2013.01)

(58) Field of Classification Search
CPC ...... B64F 5/0036; B64F 5/0009; B66F 9/063; B66F 9/0755; B66F 9/07572; G05D 1/0291; G05D 19/41895; B23Q 3/186
USPC ......................................................... 701/50
See application file for complete search history.

(56) References Cited

U.S. PATENT DOCUMENTS

2005/0131645 A1* 6/2005 Panopoulos .......... B60P 1/5457
701/472

FOREIGN PATENT DOCUMENTS

| DE | 19531520 | 1/1997 |
|---|---|---|
| EP | 2221151 | 2/2010 |

(Continued)

OTHER PUBLICATIONS

Extended European Search Report for EP App No. 15154153, dated Jul. 30, 2015.
Wheelift Systems, Case Study #2, www.wheelift.com/02-aircraft-assembly-f35.html, downloaded Jul. 15, 2013, (2) pgs.
Wheelift Systems, Case Study #4, www.wheelift.com/04-alumnia-processing.html, downloaded Jul. 15, 2013, (2) pgs.

(Continued)

*Primary Examiner* — Richard Camby
(74) *Attorney, Agent, or Firm* — The Small Patent Law Group, LLC; Joseph M. Butscher

(57) ABSTRACT

Systems and methods for movement of objects are provided. One system includes a plurality of vehicles configured to support the object, wherein each of the vehicles includes omni-directional wheels and a height adjusting device. The system also includes a control system in communication with the plurality of vehicles, wherein the control system is configured to transmit a signal to the plurality of vehicles instructing the plurality of vehicles to move the object in a predetermined direction along the floor. Each of the plurality of vehicles is configured to adjust at least one of a direction of movement using the omni-directional wheels or a height at which the object is supported while moving the part in the predetermined direction using the height adjusting device.

22 Claims, 9 Drawing Sheets

(56) References Cited

FOREIGN PATENT DOCUMENTS

| | | |
|---|---|---|
| EP | 2604524 | 11/2012 |
| GB | 2473100 | 8/2010 |

OTHER PUBLICATIONS

Wheelift Systems, Case Study #14, www.wheelift.com/14-copper-rolling-mill.html, downloaded Feb. 25, 2014, (2) pgs.

\* cited by examiner

SYSTEMS AND METHODS FOR MOVEMENT OF OBJECTS

BACKGROUND

The present disclosure relates generally to systems and methods of moving objects, such as large rigid structures, over uneven surfaces.

Moving large structures (e.g., aircraft wings) over uneven surfaces is a complicated process. For example, as the size of the structure increases, such as the length and/or width, small changes in height at different locations due to the uneven surface induces unwanted load in the structure. These unwanted loads can cause wear and/or damage to the structure. Additionally, this problem becomes even more complex when trying to move the large structure using multiple movable parts and controllers. For example, if the large structure is supported in multiple locations by different movable supports, changes in the height of the surface (e.g., uneven floor) can cause the movable supports to drift in unwanted directions, which can result in unstable motion of the structure.

In the aircraft industry, such as in an aircraft wing manufacturing application, large jigs are built to support the wing. As such, when the wing size or configuration changes, different jigs have to be built or the jigs moved with respect to the wing (which may require crane assistance to reposition the wing). For example, during subassembly, parts are moved along the floor as the parts are assembled. For commercial aircraft, a part, such as a wing, is moved from station to station along the assembly line by placing the wing in a fixture (jig) and lifting the fixture with a crane. This process can be time consuming and cumbersome.

In some other systems, dedicated moving systems are designed for moving a specific aircraft part. However, different moving systems have to be provided for each different part, which adds cost and complexity, for example, to the manufacturing process.

SUMMARY

In accordance with one embodiment, a system for moving an object along a floor is provided. The system includes a plurality of vehicles configured to support the object, wherein each of the vehicles includes omni-directional wheels and a height adjusting device. The system also includes a control system in communication with the plurality of vehicles, wherein the control system is configured to transmit a signal to the plurality of vehicles instructing the plurality of vehicles to move the object in a predetermined direction along the floor. Each of the plurality of vehicles is configured to adjust at least one of a direction of movement using the omni-directional wheels or a height at which the object is supported while moving the part in the predetermined direction using the height adjusting device.

In accordance with another embodiment, a method for moving an object along a floor is provided. The method includes determining a direction of movement of the object along the floor and communicating a signal to a plurality of vehicles supporting the object on the floor, wherein the signal causes the plurality of vehicles to move the object in the determined direction of movement. Each of the plurality of vehicles includes omni-direction wheels. The method also includes automatically adjusting at least one of (i) a direction of movement of the plurality of vehicles based on the communicated signal or (ii) a height at which the object is supported above the ground based on a measured load on one or more of the plurality of vehicles, while the object is moved in the determined direction.

The features and functions discussed herein can be achieved independently in various embodiments or may be combined in yet other embodiments, further details of which can be seen with reference to the following description and drawings.

DETAILED DESCRIPTION

Figure 1:
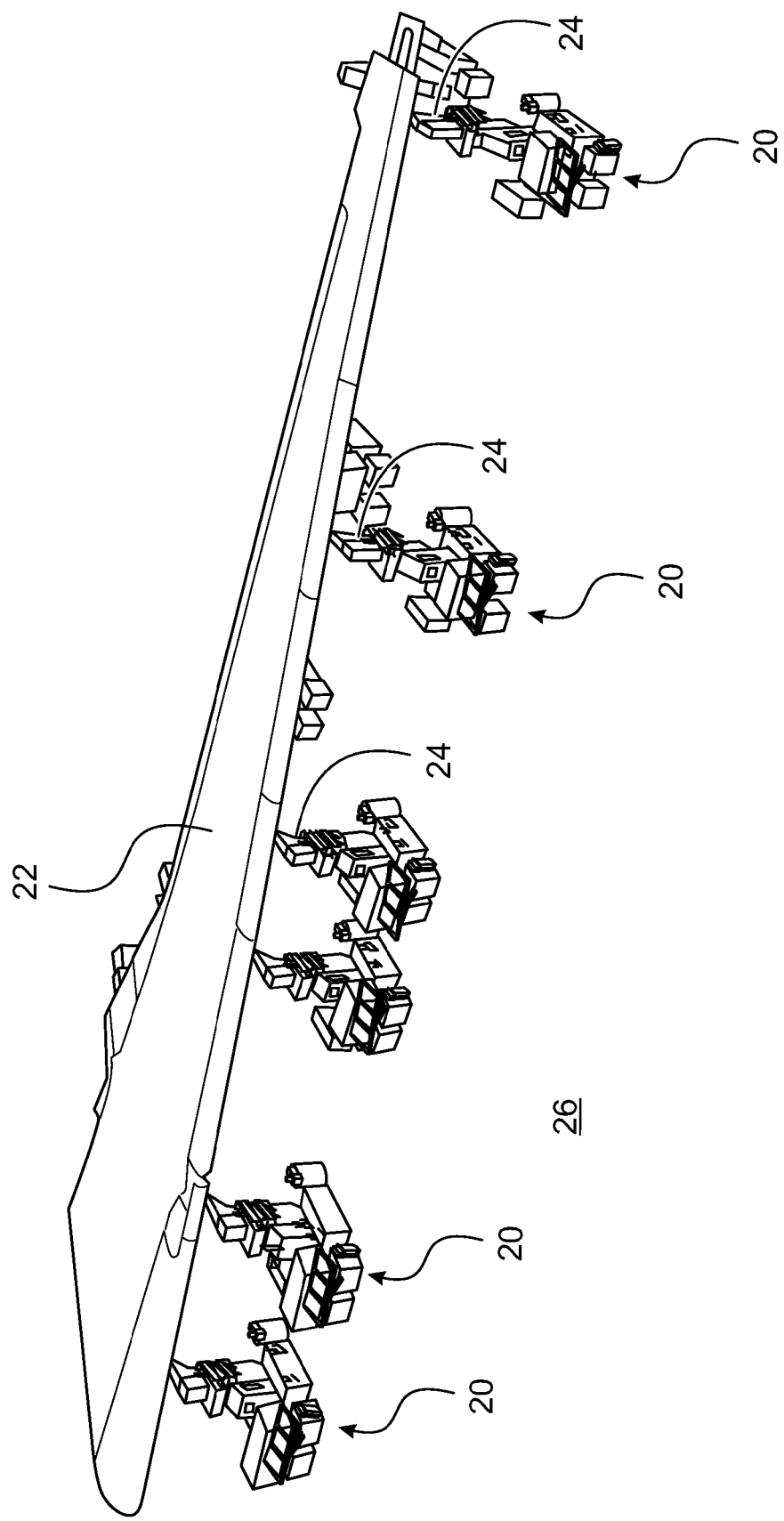
FIG. 1 is an illustration of omni-directional vehicles coupled to a wing for coordinated movement in accordance with an embodiment.

The following detailed description of certain embodiments will be better understood when read in conjunction with the appended drawings. It should be understood that the various embodiments are not limited to the arrangements and instrumentality shown in the drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules, systems, or units shown in the attached figures may represent the hardware that operates based on software or hardwired instructions, the software that directs hardware to perform the operations, or a combination thereof.

Described herein are methods and systems for controlling movement of a plurality of vehicles to move a structure or object supported thereon. For example, various embodiments provide coordinated movement of multiple support vehicles to move large structures (e.g., an aircraft wing) such that a load is not induced in the large structures or maintained within an acceptable tolerance level. In various embodiments, methods and systems control and compensate the movement of large rigid structures over uneven surfaces (e.g., aircraft factory floor) using a distributed array of omni-directional vehicles. For example, the omni-directional vehicles may be autonomous or independent omni-directional vehicles that are physically independent and coupled together only by the structure being moved by the omni-directional vehicles. By practicing one or more embodiments, scalable and flexible independent motion of objects may be provided. Additionally, by practicing various embodiments, stresses or loads induced in an object that is being moved may be reduced or minimized.

In some embodiments, control of a plurality of independent omni-directional units attached to an object, such as a large aircraft part, is provided. The control allows for movement over uneven surfaces, for example, a factory floor, in a way that reduces, minimizes or eliminates stresses and/or loads that may be applied to or induced in the object during movement. For example, in various embodiments, a plurality of omni-directional vehicles are controlled to move a part in a particular direction, while each of the omni-directional vehicles have at least some autonomy to adjust for variations in a contour of a floor to maintain movement in the particular direction without inducing a load, or inducing a reduced or minimized load, on the object or part being moved by the omni-directional vehicles. Various embodiments also provide a reconfigurable system for moving parts, such as along an assembly line for aircraft manufacturing.

Generally, in operation, various embodiments control omni-directional vehicles to adjust or compensate for height elevations of the floor (such as floor unevenness) that can induce loads to the object or part as the object or part is moved over the floor by the omni-directional vehicles. For example, by controlling the omni-directional vehicles in multiple axes and/or changing the carrying height of the object, the contour of the floor does not cause the vehicle to drift from a path, thereby reducing or eliminating induced loads on the object or part. In one embodiment, the omni-directional vehicles may be used to move an aircraft wing along an assembly line, which may include first moving to a location for coupling of the spars and ribs together as known in the art and then moving the aircraft wing before the skin is coupled to the spars and/or ribs. Using various embodiments, with reduced or eliminated load, the aircraft wing may be moved with the omni-directional vehicles instead of using a crane and specialized fixtures. Thus, omni-directional vehicles allow the aircraft wing to be moved at different steps during the assembly process.

Thus, using various embodiments, a plurality of omni-directional vehicles may be controlled to move a part as the part is assembled, and before the part is strong enough to withstand certain induced loads. For example, the omni-directional vehicles can each move in any of a plurality of directions and adjust a carrying height. The omni-directional vehicles may be positioned around the part with the part geometry and omni-directional vehicle locations programmed into a control system. The control system controls the omni-directional vehicles to move the part in a particular direction. However, it should be appreciated that one or more, and in some embodiment, each omni-directional vehicle, has some freedom to adjust a direction of travel and/or carrying height to account for the floor contour or unevenness to keep the part moving in the particular direction. In various embodiments, control of the system separates tasks among each vehicle and a master control system. Accordingly, in various embodiments, the master control system controls all of the vehicles to move on or along a path, but each vehicle determines how to move to stay on the path. Further, a network may be provided to transfer data among the vehicles and between the vehicles and the master control system. When a different part is to be moved by the system, the new part geometry and the position of the vehicles are input into the master control system. Thus, the same system can then be used to move the different parts without having to make a special fixture for the parts.

For example, in one embodiment, the vehicles may start in a nominal position and move to the part, and then move the part in concert with each other. Because the vehicles are in communication with each other and the master control system, different operators may control the movement with relative ease.

It should be noted that while various embodiments are described in connection with an aircraft application, one or more embodiments may be used or adapted for use in different applications. For example, various embodiments may be used in manufacturing rotorcraft, spacecraft, marine vehicles (boats, yachts, submarines), and automobiles, as well as floor panels and membranes of buildings, among others.

With particular reference now to FIG. 1, a plurality of vehicles, illustrated as omni-directional vehicles 20, are shown coupled to an object, in particular an aircraft wing 22. The omni-directional vehicles 20 in various embodiments include omni-direction wheels as described herein. It should be noted that the number and positioning of the omni-directional vehicles 20 may be varied as desired or needed. For example, additional or fewer omni-directional vehicles 20 may be provided along one or more of the front, back, or sides of the wing 22. Additionally, the omni-directional vehicles 20 may be positioned having a different spacing, and the number of omni-directional vehicles 20 on each side or front and back of the wing 22 may be the same or different. In various embodiments, the number and location of the omni-directional vehicles 20 that are used is based on the particular object to be moved and the structural requirements for the object. For example, in the illustrated embodiment, the positioning and number of omni-directional vehicles 20 may be determined based on the load or travel requirements for the wing 22.

The omni-directional vehicles 20 may be configured similarly, for example, having the same operating characteristics, dimensions, etc. However, in some embodiments, one or more of the omni-directional vehicles 20 may be different than the other omni-directional vehicles 20. Additionally, the type of operating characteristics of the omni-directional vehicles 20 may be determined, for example, based on the application or object to be moved. It should be noted that the omni-directional vehicles 20 may be any type of vehicles, such as remote controlled ground vehicles, that provide control of motion in multiple directions or axes. Additionally, omni-directional vehicles 20 include support members 24 to support and couple the wing 22 to the omni-directional vehicles 20, and which provide for height adjustment of the wing 22 relative to the omni-directional vehicles 20.

In the illustrated embodiment, the omni-directional vehicles 20 are controlled to move the wing 22 over a surface 26, which in this embodiment is an uneven factory floor. For example, as described in more detail herein, coordinated movement of the omni-directional vehicles 20 is provided to accommodate or account for variations in the contour of the surface 26 (e.g., changing contour of a floor), such that the wing 22 is maintained in a generally fixed plane and orientation, when the wing 22 is moved by the omni-directional vehicles 20. For example, the omni-directional vehicles 20 are controlled in multiple movement axes as described in more detail herein. Adjustments may be performed, such as for the angle of travel or height variations in the floor, to maintain the wing 22 in a generally horizontal position or a same relative position and orientation as the wing 22 is moved. For example, the wing 22 may be transported from a location to a different location along a manufacturing line. Thus, the omni-directional vehicles 20 may control and compensate for an uneven factory floor while moving the wing 22, which is removably coupled to the omni-directional vehicles 20. As should be appreciated, and as can be seen in FIG. 1, the omni-directional vehicles 20 are not physically connected other than by the wing 22 supported on the omni-directional vehicles 20. With the omni-directional vehicles 20 being removably coupled to the wing 22, the omni-directional vehicles 20 may be repositioned on the wing 22 or another wing 22 or object and controlled. As such, flexibility and reusability are provided, wherein different configurations of objects (e.g., products) can flow or move down the same assembly line.

The object being supported and moved is not limited to a wing 22 (or wing assembly). For example, in an aerospace application, the object may be a horizontal stabilizer assembly, a fuselage assembly, or other structure forming part of the aircraft.

Figure 2:
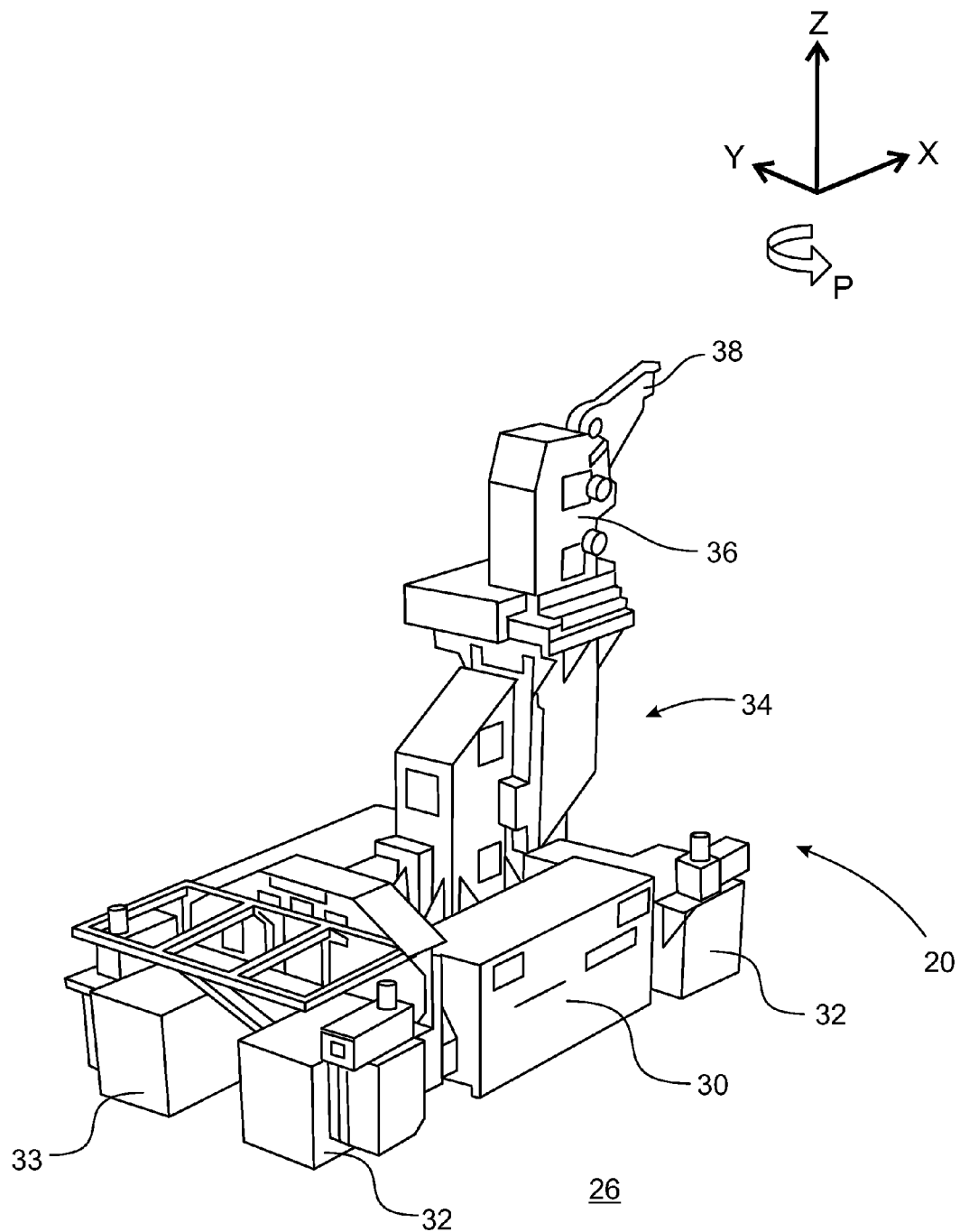
FIG. 2 is an illustration of one of the omni-directional vehicles of FIG. 1.

FIG. 2 illustrates an omni-directional vehicle 20 provided in accordance with one embodiment. In this embodiment, the omni-directional vehicle 20 includes a base 30 having a plurality of wheel assemblies 32 (having one or more wheels, not shown) that allow for movement of the omni-directional vehicle 20 in multiple different directions (e.g., X and Y direction as illustrated by the arrows). The wheel assemblies 32 also may be capable of independent pivoting movement (or rotation) in different directions along the surface 26 (e.g., P direction as illustrated by the arrows), such as to change or adjust a rotational position along the surface. Additionally, the wheel assemblies 32 may allow for independent movement in the vertical direction, such as to raise or lower the wheel assembly 32 (e.g., Z direction as illustrated by the arrows). Accordingly, the wheel assemblies 32 allows for each wheel assembly 32 to be at a different heights (different distances relative to the wing 22). In some embodiments, the base 30 also includes one or more jacks (not shown) to allow lifting the omni-directional vehicles 20 above the floor such that the wheels of the wheel assemblies 32 are not in contact of the floor (e.g., to park the wheel assemblies 32).

The omni-directional vehicle 20 also includes a vertical support member 34, which in various embodiments may be configured as a height adjusting device that includes an actuator that allows for Z direction movement (e.g., up and down movement as viewed in FIG. 2) to change the relative distance between the base 30 and the wing 22. For example, the vertical support member 34 is configured to allow for upward and downward movement thereof to change a relative distance between the portion of the wing 22 to which the omni-directional vehicle 20 is coupled and the base 30 of the omni-directional vehicle 20.

In the illustrated embodiment, the omni-directional vehicle 20 includes an upper support member 36 coupled to the vertical support member 34 and separately moveable with respect to the vertical support member 34. For example, the upper support member 36 in various embodiments is configured for rotational movement (e.g., P direction as illustrated by the arrow) relative to the vertical support member 34. Thus, the surface between the upper support member 36 and the vertical support member 34 may define a rotation slip plane, namely an X-Y rotation slip plane in this embodiment.

The omni-directional vehicle 20 also includes an engagement portion 38 coupled to the upper support member 36 (which may form part of the upper support member 36 in some embodiments). The engagement portion 38 may be any structure or device that allows for removable coupling to the wing 22 or other object. The engagement portion 38 may be capable of movement in multiple directions to align with the surface of the wing 22 to which the engagement portion 38 is to be coupled. The engagement portion 38 may be any fastening or connecting member (e.g., clamps, coupling support arms, etc.) that allows for the coupling to the wing 22. The engagement portion 38 may also attach in different manners or in different directions or orientations, such as based on where on the wing 22 attachment is made.

It should be noted that the vertical support member 34 and upper support member 36 may define different control regimes when moving the wing 22. In some embodiments, the vertical support member 34 and upper support member 36 generally define mechanical devices used as a lifting device and/or movement device (e.g., rotation device).

Thus, in some embodiments, the omni-directional vehicle 20 includes wheel assemblies 32 that provide omni-directional wheels that allow motion in any direction or rotation. Additionally, the vertical support member 34 includes a Z direction actuator with load cell feedback capability as described in more detail herein. Further, the arrangement of the vertical support member 34 and the upper support member 36 defines X,Y and rotation about Z motion with one or more slip planes or servomechanisms (also referred to as servos) actuated with load feedback. However, it should be noted that different types or movements or motions may be provided by configuring the omni-directional vehicle 20 differently as described herein. For example, the types or movement and relative movements may be changed as desired or needed, such as based on the particular application or object to be moved or transported. Thus, while each omni-directional vehicle 20 is independently movable, the set of omni-directional vehicles 20 are together controller in coordinated movement to move the wing 22. For example, the omni-directional vehicles 20 may be controlled to move the wing 22 along the surface 26, such as a large factory with concrete slabs that with time, settle differently to each other, creating uneven surfaces. However, other unevenness may exist, such as transitions created by utilities channels on the floor.

It should be noted that the omni-directional vehicles 20 may include one or more sensors, such as location or position sensors, or encoders, that allow for the determination of the location of the omni-directional vehicles 20, as well as the position and orientation of different components of the omni-directional vehicles 20. For example, the sensors 64 (shown in FIG. 3) that communicate different information may communicate feedback information. For example, the sensors 64 may be locations sensors (e.g., GPS sensors or other type of location sensor) that provide the location in space of the omni-directional vehicles 20. Additionally, one or more sensors 64 (e.g., an encoder) may provide the orientation or position of a component of the omni-directional vehicles 20, such as the orientation or position of the base 30, vertical support member 34, or upper support member 36. In some embodiments, for example, the orientation or position information may include relative information with respect to other components. In various embodiments, the orientation or position information includes information, such as, the height or rotation angle, among other information, of one or more of the components of the omni-directional vehicles 20.

Figure 3:
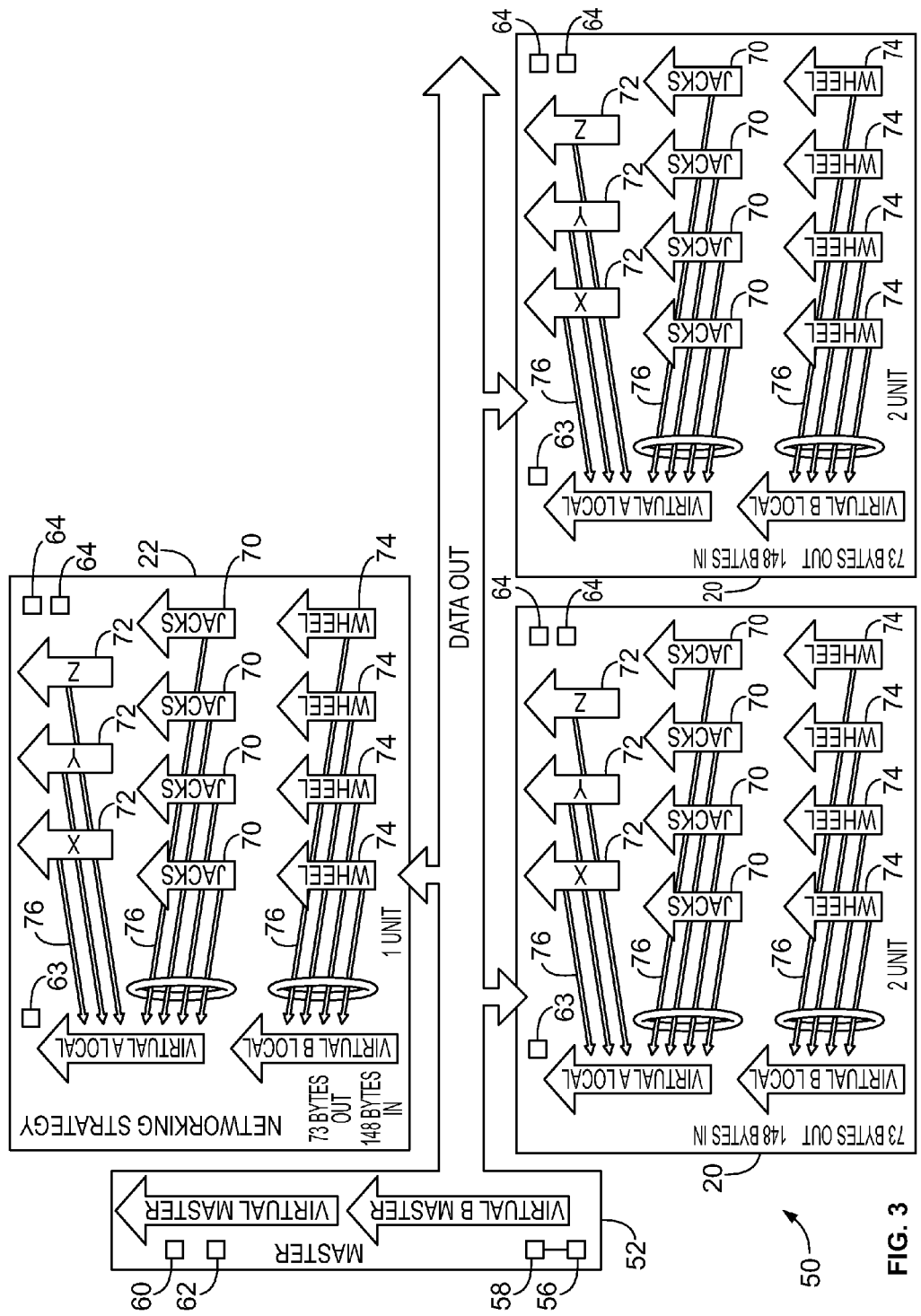
FIG. 3 is a block illustration of control system in accordance with an embodiment.

FIG. 3 is a diagram of a control system 50 in accordance with various embodiments for controlling the omni-directional vehicles 20. The control system 50 includes a master controller 52 that communicates with and controls the omni-directional vehicles 20, for example, communicates with communication devices 63 (e.g., transceivers) of the omni-directional vehicles 20 (e.g., sending control signals to the omni-directional vehicles 20). As discussed in more detail herein, the omni-directional vehicles 20 may be individually controllable. However, various embodiments provide for control of one or more of the omni-directional vehicles 20, such as in subsets. The master controller 52 controls the movement of each of the omni-directional vehicles 20, which may be based on feedback received from one or more of the omni-directional vehicles 20 (however some independent local control is provided as described herein). For example, a communication link 54 (e.g., a network) is provided between the master controller 52 and each of the individual omni-directional vehicles 20. Additionally, one or more of the omni-directional vehicles 20 may communicate with one or more of the other omni-directional vehicles 20 via the communication link 54. For example, a control command from the master controller 52 may be communicated to one of the omni-directional vehicles 20, which then communicates the control command (or another control command or feedback) to another one of the omni-directional vehicles 20. Thus the omni-directional vehicles 20 may transmit data therebetween and/or between the omni-directional vehicles 20 and the master controller 52.

It should be noted that the communication link 54 in various embodiment may be any type of wireless communication link and may use any type of wireless communication protocol (e.g., 802.11b or 802.11g wireless standards). For example, the communication link 54 may be configured based on the type and amount of data to be communicated or the distance over which the data is to be communicated. However, the communication link 54 may be configured based on other factors, such as security.

The master controller 52 may be any type of controller, which may include or be embodied as a computing system and that may perform one or more methods or processes as described in more detail herein. The master controller 52 may be provided, for example, as any type of computing device, including, but not limited to, personal computing systems, among others. The master controller 52, for example, may be a computing system that includes a logic subsystem 56, a storage subsystem 58 operatively coupled to the logic subsystem 56, one or more user input devices 60, and a display subsystem 62. The master controller 52 may optionally include components not shown in FIG. 3, and/or some components shown in FIG. 3 may be peripheral components that do not form part of or are not integrated into the computing system.

The logic subsystem 56 may include one or more physical devices configured to execute one or more instructions. For example, the logic subsystem 56 may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem 56 may include one or more processors and/or computing devices that are configured to execute software instructions. Additionally or alternatively, the logic subsystem 56 may include one or more hardware or firmware logic machines configured to execute hardware or firmware instructions. The logic subsystem 56 may optionally include individual components that are distributed throughout two or more devices, which may be remotely located in some embodiments.

The storage subsystem 58 may include one or more physical devices (that may include one or more memory areas) configured to store or hold data (e.g., input data) and/or instructions executable by the logic subsystem 56 to implement one or more processes or methods described herein. When such processes and/or methods are implemented, the state of the storage subsystem 58 may be transformed (e.g., to store different data or change the stored data). The storage subsystem 58 may include, for example, removable media and/or integrated/built-in devices. The storage subsystem 58 also may include, for example, other devices, such as optical memory devices, semiconductor memory devices (e.g., RAM, EEPROM, flash, etc.), and/or magnetic memory devices, among others. The storage subsystem 58 may include devices with one or more of the following operating characteristics: volatile, nonvolatile, dynamic, static, read/write, read-only, random access, sequential access, location addressable, file addressable, and content addressable. In some embodiments, the logic subsystem 56 and the storage subsystem 58 may be integrated into one or more common devices, such as an application specific integrated circuit or a system on a chip. Thus, the storage subsystem 58 may be provided in the form of computer-readable removable media in some embodiments, which may be used to store and/or transfer data and/or instructions executable to implement the various embodiments described herein, including the processes and methods.

In various embodiments, one or more user input devices 60 may be provided, such as a keyboard, mouse, or trackball, among others. However, it should be appreciated that that other user input devices 60, such as other external user input devices or peripheral devices as known in the art may be used. A user is able to interface or interact with the master controller 52 using the one or more input devices 60 (e.g., select or input data).

Additionally, in various embodiments, a display subsystem 62 (e.g., a monitor) may be provide to display information of data as described herein. For example, the display subsystem 62 may be used to present a visual representation of an output (e.g., locations of the omni-directional vehicles 20) or data stored by the storage subsystem 58. In operation, the processes and/or methods described herein change the data stored by the storage subsystem 58, and thus transform the state of the storage subsystem 58, the state of display subsystem 62 may likewise be transformed to visually represent changes in the underlying data. The display subsystem 62 may include one or more display devices and may be combined with logic subsystem 56 and/or the storage subsystem 58, such as in a common housing, or such display devices may be separate or external peripheral display devices.

Thus, the various components, sub-systems, or modules of the master controller 52 may be implemented in hardware, software, or a combination thereof, as described in more detail herein. Additionally, the processes, methods, and/or algorithms described herein may be performed using one or more processors, processing machines or processing circuitry to implement one or more methods described herein.

As can be seen in FIG. 3, different types of control commands may be provided by the master controller 52, which may define virtual master controls that generate commands and control different ones of the omni-directional vehicles 20 or different components or operations of one or more of the omni-directional vehicles 20. For example, in FIG. 3, a Virtual A Master control and a Virtual B Master control generate commands to control the different components, which may be based on feedback received from the controlled components associated with the Virtual Control or with other Virtual Controls. In the illustrated embodiment, Virtual A Master control provides control of and generates commands to a plurality of jacks (illustrated by the arrows 70) of the omni-directional vehicles 20, such as to control the vertical position of the omni-directional vehicles 20. The Virtual A Master control also controls movement in the different axes as represented by the arrows 72. The Virtual B Master control provides control of and generates commands to a plurality of wheels, for example, the wheel assemblies 32 (shown in FIG. 2) as illustrated by the arrows 74. Additionally, feedback data (such as location, position and/or orientation information from the sensors 64) is communicated to the Virtual A Master control and the Virtual B Master control as illustrated by the arrows 76. It should be noted that reference numerals are only provided for one of the omni-directional vehicles 20 shown in FIG. 2, but similar control and commands, as well as feedback are provided for the other omni-directional vehicles 20.

Thus, the control system 50 controls the omni-directional vehicles 20, for example, to communicate a defined travel path and/or command different movements of the omni-directional vehicles 20. For example, the master controller 52 in combination with the omni-directional vehicles 20 defines a network wherein commands and/or data, such as feedback data, is communicated between the master controller 52 and the omni-directional vehicles 20. It should be noted that the commands and data may be communicated continuously or non-continuously, such as at determined intervals or based on certain actions or feedback. However, the commands and data may be communicated at different times and whenever desired or needed, for example, based on the control requirements of the object being moved by the omni-directional vehicles 20.

In some embodiments, the control system 50 may implement a hybrid control methodology wherein an overcall control scheme is controlled by the master controller 52 and other control operations, for example, sensor calculation and compensation is performed by the individual omni-directional vehicles 20, with the combination or sum of all the motion resulting in the controlled overall motion of the object over an uneven surface, such as to maintain the position and orientation of the wing 22 with respect to the omni-directional vehicles 20. For example if the master controller 52 receives instructions to perform an overall forward movement, the information for such movement is transferred and executed. Additionally, while the movement is performed over the floor, compensation for X,Y,Z adjustments are performed by the omni-directional vehicles 20 to keep the overall system on track, namely to maintain the controlled overall forward movement. Thus, an overall movement system is defined by the coordination and communication between the master controller 52 and the omni-directional vehicles 20. In some embodiments, a plurality of different factors and properties or states of the various components are monitored and/or analyzed as part of the overall control, which may be performed globally by the master controller 52 or individually by the omni-directional vehicles 20. For example, each of the omni-directional vehicles 20 may perform individual checks to ensure proper movement and alignment with the wing 22.

Figure 4:
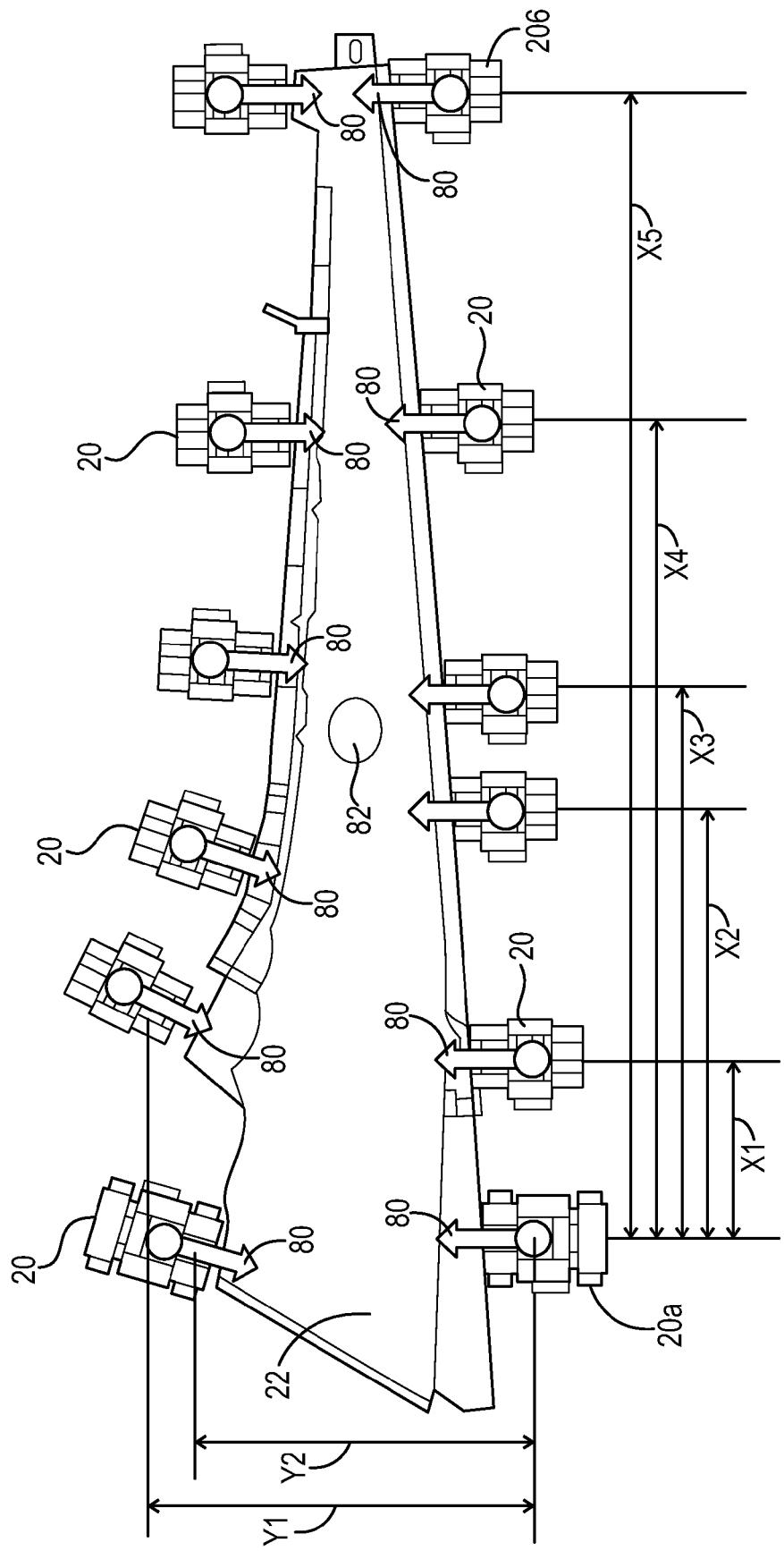
FIG. 4 is an illustration showing coordinated movement in accordance with various embodiments.

FIG. 4 illustrates controlled movement of the omni-directional vehicles 20 in accordance with various embodiments. It should be noted that in some embodiments, the movement of one or more of the omni-directional vehicles 20 may be fixed in one or more directions during the performance of the overall motion operation. For example, one or more of the omni-directional vehicles 20 may have one or more motion directions or axes disabled during performance of the overall motion operation, such that an initial setting for that direction or motion or rotation is not changed during the performance of the overall motion operation. The determination to set and fix or lock the movement direction or rotation position may be determined as part of the overall motion course to be traversed by the omni-directional vehicles 20. For example, based on a starting and ending point for the travel path of the omni-directional vehicles 20, one or more of the omni-directional vehicles 20 may have a particular operation set and fixed for the entire duration of the overall motion operation from the starting point to the ending point. For example, the omni-directional vehicle 20a may be fixed in all directions, the omni-directional vehicle 20b fixed in one direction, and the omni-directional vehicle 20c fixed in two directions (wherein in this example the directions are the X, Y, and Z direction and pivoting or rotation as shown in FIG. 2). In this example, the other omni-directional vehicles 20 may be controlled and can operate in all directions. Thus, for example, an omni-directional vehicle 20 may be fixed from rotating, but allowed to change directions or may not be allowed to change direction, but can rotate.

In the described example, operation may be controlled such that one or more of the omni-directional vehicles 20 maintains a same relative location with respect to other ones of the omni-directional vehicles 20. For example, the distances between the omni-directional vehicles 20 on one side of the wing 22 are maintained as illustrated by the distances X1, X2, X3, X4, and X5. As can be seen, the distance between different ones of the omni-directional vehicles 20 is not the same. However, in some embodiments, the distances are the same. Additionally, other relative distance between omni-directional vehicles 20 may be determined and maintained, such as in y-directions, illustrated by the distance Y1 and Y2.

Thus, in various embodiments, the physical location of all of the omni-directional vehicles 20 in relation to the wing 22 is determined (such as using one or more of the sensors 64 (shown in FIG. 3), as well as the relative locations of the omni-directional vehicles 20 with respect to each other. In one embodiment, each omni-directional vehicle 20 is represented as a point on an X,Y plane with a direction vector (represented by the arrows 80) in relation to an origin 82 (which is a virtually defined point of the wing 22, such as the middle). This information is received and input into the master controller 52 (shown in FIG. 3) and the master controller 52 pre-calculates or predetermines how each omni-directional vehicle 20 should move depending on the type of motion. For example, the master controller 52 may use different mathematical constructs or models to determine the movement for the omni-directional vehicles 20. It should be noted that the determination of the movement for each of the omni-directional vehicle 20 is based on the object being moved, in this case the wing 22. In various embodiments, the degrees of freedom of the object and how the object is attached to the omni-directional vehicles 20 is determined so that the object is not over constrained and is allowed to float as described in more detail herein.

As should be appreciated, the omni-directional vehicles 20 may be controlled separately or as a group or subset. For example, in various embodiments, one or more of the omni-directional vehicles 20 may operate semi-independently of one or more of the other omni-directional vehicles 20. For example, in order to move along a motion, one or more of the omni-directional vehicles 20 may move similarly, such as making the same degrees of turn(s) and moving at the same speed. However, one or more of the omni-directional vehicles 20 may make turns having different degrees or changes of directions, as well as may move at different speeds to other ones of the omni-directional vehicles 20. For example, when moving the wing 22 along a calculated motion path, the wing 22 may have to be turned or rotated at certain locations along the motion path. During turning operation, using the relative location information between the omni-directional vehicles 20 and the ability to communicate therebetween, as well as with the master controller 52 (shown in FIG. 3), one or more of the omni-directional vehicles 20 moves at a different speed or turns at a different angle than one or more of the other omni-directional vehicles 20 to perform, for example, a turning of the wing 22 along the motion path. For example, one or more of the omni-directional vehicles 20 at one of the ends of the wings 22 will increase a relative speed with respect to one or more of the omni-directional vehicles 20 at a middle or other end of the win 22 (in some instances some of the omni-directional vehicles 20 may be stationary). Additionally, one or more of the omni-directional vehicles 20 may change or adjust a turn direction or angle more or less than one or more of the other omni-directional vehicles 20 to provide a different relative speed or adjusted turn angle (e.g., at least one of move at a different speed or different adjusted turn angle than the other ones of the plurality of vehicles). The differences in speed and/or angle of turn is coordinated as described herein and allows, for example, for the wing 22 to be moved along a non-linear motion path. The coordination between the omni-directional vehicles 20 may be provided using communication between the omni-directional vehicles 20, as well as with the master controller 52 as described herein.

Figure 5:
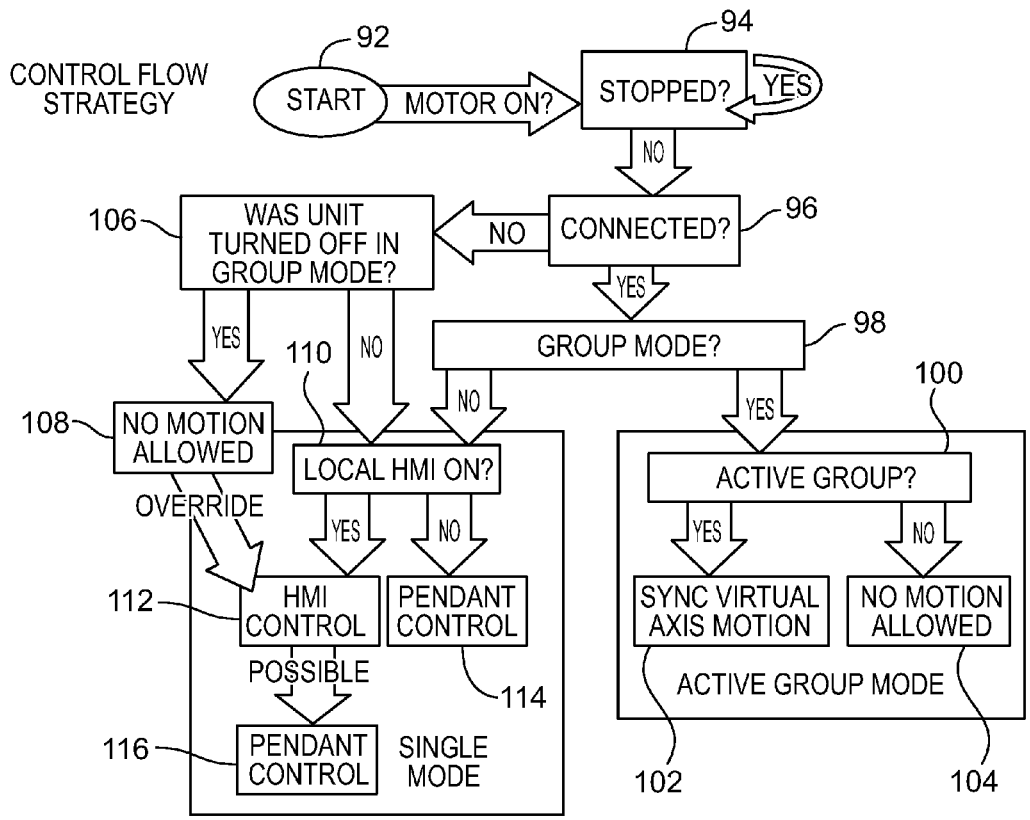
FIG. 5 is an illustration of a control flow in accordance with an embodiment.

As discussed herein, the omni-directional vehicles 20 may be controlled separately or as a group or subset. FIG. 5 illustrates a control flow 90 in accordance with one embodiment, wherein a single mode of operation and active group mode of operation are provided. The flow 90 begins at 92 wherein the motor of the omni-directional vehicles 20 is activated or turned on. A determination may be made at 94 as to whether an emergency stop of any of the motors is made. In various embodiments, if an emergency stop is activated (such as by an operator), movement of all omni-directional vehicles 20 is halted and not restarted until the emergency stop command is reset.

The flow 90 then includes determining whether the omni-directional vehicles 20 are connected at 96. For example, a determination is made as to whether one or more of the omni-directional vehicles 20 is communicatively linked with one or more of the other omni-directional vehicles 20, such as through the communication link 54 (shown in FIG. 3). If a determination is made that one or more of the omni-directional vehicles 20 are connected, then a determination is made at 98 whether a group mode is selected. For example, an operator input may set a group mode of operation or single mode of operation. It should be noted that a selection of a group mode may include a selection of all of the active omni-directional vehicles 20 or a subset of the omni-directional vehicles 20.

If a group mode is activated or selected, then a determination is made at 100 whether the group selected is an active group. If the selection is an active group selection, then at 102 the virtual axis motion of the omni-directional vehicles 20 is synchronized at 102. For example, as described herein, coordinated movement of the omni-directional vehicles 20 is provided. However, if the group of omni-directional vehicles 20 is not an active group, then no motion is allowed at 104. For example, the omni-directional vehicles 20 may remain in a halted mode.

The flow 90 that results in operation in the single mode will now be described. In particular, if at 96 a determination is made that the omni-directional vehicles 20 are not connected, then at 106 a determination is made as to whether the omni-directional vehicles 20 (which may include one or more omni-directional vehicles 20) was turned off in the group mode. If the omni-directional vehicle 20 was turned off in a group mode then no motion is allowed at 108 unless an override is provided. If the omni-directional vehicle 20 was not turned off in group mode or if the group mode was not selected at 98, then a determination is made at 110 as to whether a local human-machine interface (HMI) is turned on. If the local HMI is turned on then HMI control is provided at 112. It should be noted that the HMI may be any type of interface and an operator may interact with the HMI using one or more input controls, such as the user input devices 60 (shown in FIG. 3). For example, the HMI may receive one or more user inputs.

If the local HMI is not on, then pendant control is provided at 114. It should be noted that pendant control additionally may be provided at 116 when HMI control is provided at 112. For example, pendant control may include using a pendant control station having a plurality of buttons for controlling the operation of the one or more of the omni-directional vehicles 20.

Thus, each of the omni-directional vehicles 20 may be controlled in different modes of operation. For example, the single mode of operation is used to separately control one or more of the omni-directional vehicles 20. In this mode of operation, the omni-directional vehicles 20 operate as individual and independent units (e.g., movement or control of other omni-directional vehicles 20 does not affect the one omni-directional vehicle 20). The group mode of operation includes controlling the omni-directional vehicles 20 in a coordinated manner such that operations of one or more of the omni-directional vehicles 20 affects the operations of one or more of the other ones of the omni-directional vehicles 20. In this group mode of operation, the master controller 52 (shown in FIG. 3) coordinates the movement as described herein. For example, the motions of the omni-directional vehicles 20 are coordinated to affect an overall motion.

Figure 6:
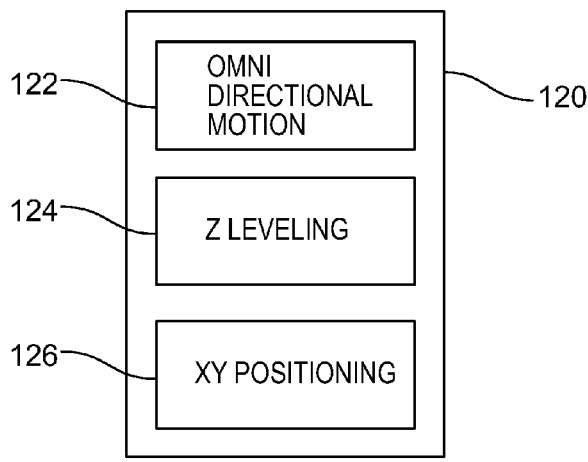
FIG. 6 is an illustration of lower level motions in accordance with an embodiment.

FIG. 6 illustrates lower level motions 120 (or local motions or operations) that may be performed by one or more of the omni-directional vehicles 20 when controlled as described herein. The lower level motions 120 may be performed in the single mode of operation or the group mode of operation. In operation, various embodiments provide for controlling motion at a local level using the lower level motions 120. The lower level motions 120 are divided into different motion types that are concurrently controlled in various embodiments. The combination of the lower level motions 120 defines a motion operation for the individual omni-directional vehicle 20 with the motion operation of a plurality of the omni-directional vehicles 20 defining an overall motion.

With respect to the lower level motions 120, these motions include an omni-directional motion 122 that controls the velocity to the wheels of the omni-directional vehicles 20, such as the wheel assemblies 32 (shown in FIG. 2) to create the desired motion direction. The lower level motions 120 also include a Z leveling 124 that controls the Z height of the omni-directional vehicles 20, which in some embodiments is based on the load that is measured by one or more load cells (or other load measuring device, which may be embodied as one of the sensors 64 of the omni-directional vehicles 20 as shown in FIG. 3, which is provide as a load sensor). In operation, based on the load, the Z height (vertical height) of the omni-directional vehicles 20 may be changed to actively or dynamically compensate or adjust for changing surface conditions, such as changing floor conditions. The lower level motions 120 also include an X,Y positioning 126, which in various embodiments includes slip plane sensing or force feedback compensation (e.g., a rotation slip plane in two axes). Thus, different types of local motions may be used or combined to affect a desired movement of each of the omni-directional vehicles 20, which may account for different measured forces or loads.

Figure 7:
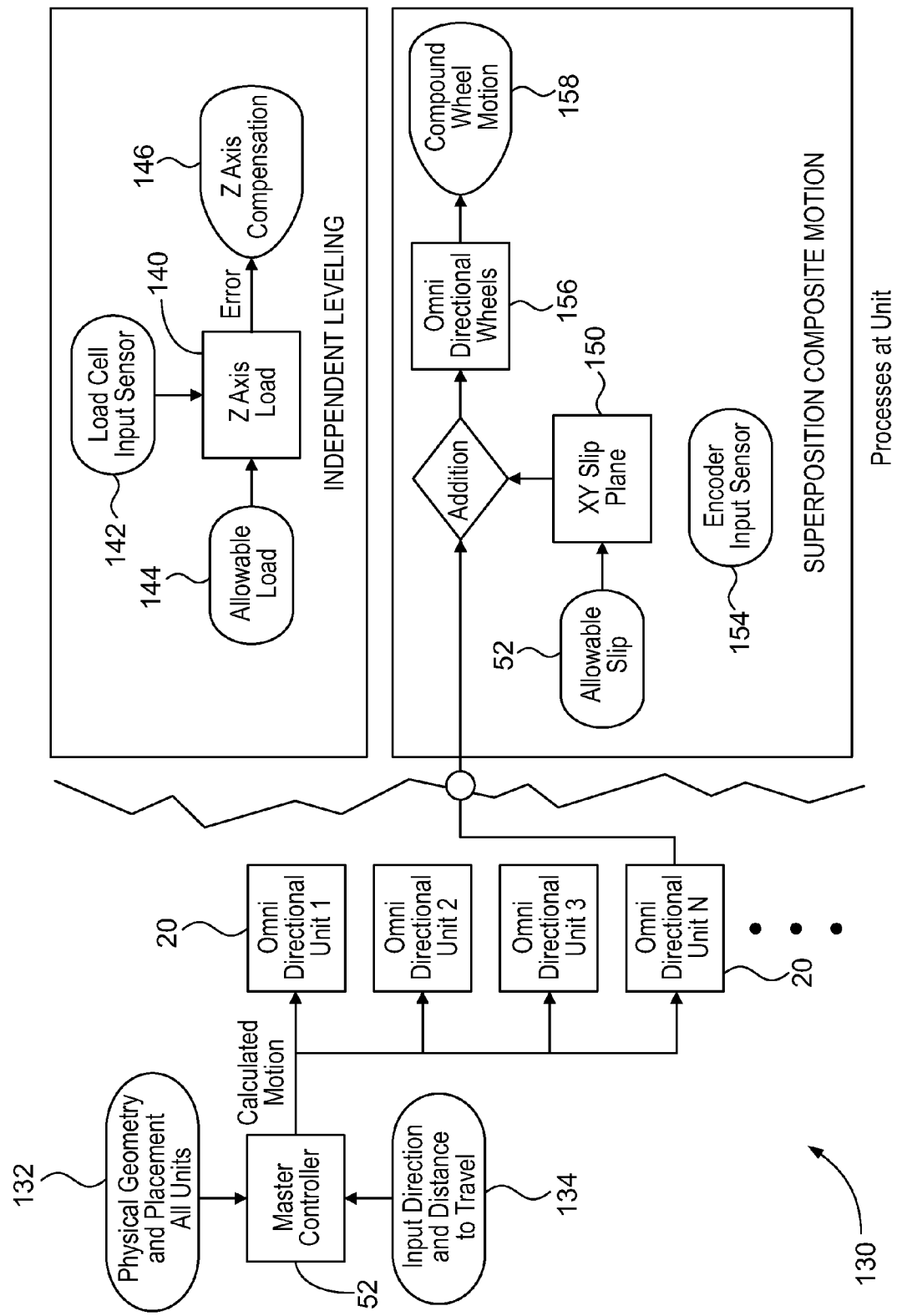
FIG. 7 is an illustration of an overall control scheme in accordance with an embodiment.

The overall motion of the object, is thus, controlled in various embodiments by controlling the operation of the omni-directional vehicles 20 in a coordinated manner. The diagram 130 of FIG. 7 illustrates an overall control scheme in accordance with various embodiments. In particular, the master controller 52 receives as an input 132, the physical geometry and placement (position) of all of the omni-directional vehicle 20 (e.g., physical geometry information and placement information), and as an input 134, the input direction and distance to travel. For example, an operator may select a type of omni-directional vehicle 20 that is being used, which defines the physical geometry thereof. However, in some embodiments, physical dimensions may be entered or a model entered. The placement of the omni-directional vehicles 20 may be determined by the location information as described herein. With respect to the input 134, the direction and distance to travel defines the path (e.g., a motion path) for the omni-directional vehicles 20. The input 132 may include, for example, selecting points on a virtual map of an assembly facility (such as using an HMI) or entering coordinates or geographic positions.

The master controller 52 uses the inputs 132 and 134 to determine a calculated motion for each of the omni-directional vehicles 20 to cause an overall motion of the object, such as the wing 22. As should be appreciated, the calculated motion can include the different lower level motions 120 for each of the omni-directional vehicles 20. It should be noted that the calculations to determine the motions may result in a motion sequence that is communicated to each of the omni-directional vehicles 20 and performed in time order.

As can be seen in FIG. 7, processing is also performed at the omni-directional vehicles 20 including independent leveling and a superposition composite motion. In particular, with respect to the independent leveling, a Z axis load 140 is maintained, such as below an allowable limit 144 based on measurement from a load cell input sensor 142 (e.g., a strain gauge). For example, the omni-directional vehicle 20 performs Z axis compensation 146 (e.g., movement upwards and downwards to change the distance of the omni-directional vehicle 20 relative to the wing 22) to maintain the load on the omni-directional vehicle 20 within an acceptable range. If the load exceeds the allowable limit 144 (e.g., load limit), operation of the omni-directional vehicle 20 may be automatically halted or a warning provided (such as via the HMI).

Superposition composite motion is also provided, which includes maintaining an X,Y slip plane 150 such as below an allowable limit 152 based on measurement from an encoder input sensor 154. The determined X,Y slip plane (e.g., slip plane force) may be used as an error signal and added to the directional information to provide omni-directional wheel control 156 that results in compound wheel motion 158. Thus, the X,Y slip plane 150 in this embodiment affects the compound motion of the wheels of the omni-directional vehicle 20. For example, a combination of movements of the different wheels may be provided.

Figure 8:
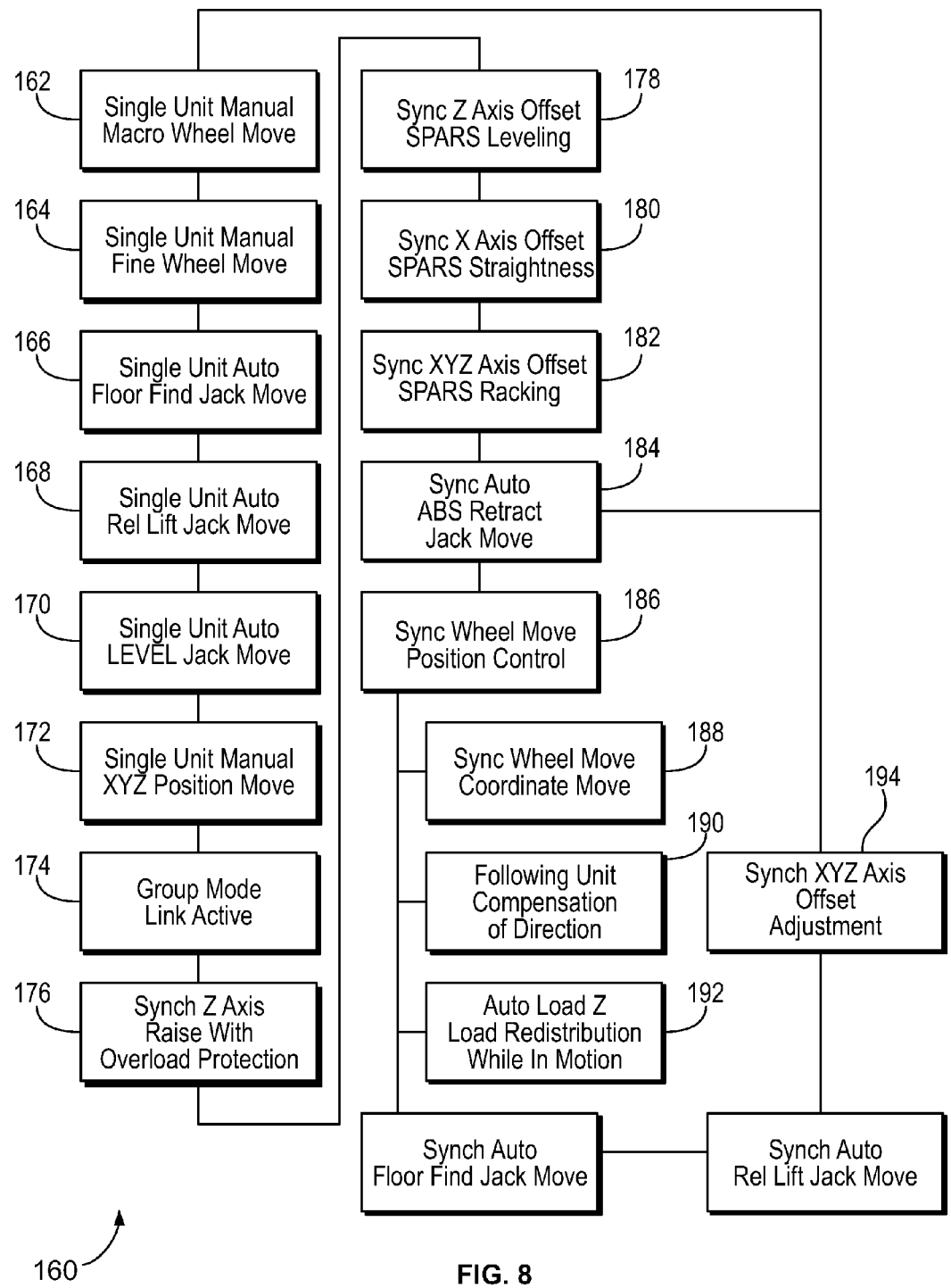
FIG. 8 is an illustration of a process scheme in accordance with an embodiment.

FIG. 8 illustrates a process scheme 160 that may define a task strategy in some embodiments. It should be noted that the process scheme 160 will be described in connection with the wing 22, but may be used or adjusted for other objects. Additionally, the process scheme 160 may define a method that may employ structures or aspects of different embodiments discussed. In various embodiments, certain steps may be omitted or added, certain steps may be combined, certain steps may be performed simultaneously, or concurrently, certain steps may be split into multiple steps, certain steps may be performed in a different order, or certain steps or series of steps may be re-performed in an iterative fashion.

The process scheme 160 includes single unit manual macro wheel movement at 162 and single unit manual fine wheel movement at 164. For example, manual control of the wheel movement of one or more of the omni-directional vehicles 20 may be provided. Additionally, jack movement may be provided as single unit automatic floor find jack movement at 166, single unit relift jack movement at 168, and single unit automatic level jack movement at 170. For example, one or more jack elements may initially contact the floor at 166 such that no additional movement is provided until all of the jacks of the omni-directional vehicle 20 contact the floor. Then, the jacks are allowed to lift together in a coordinated manner at 168 and leveled at 170, such as with the omni-directional vehicles 20 about one quarter inch off the ground.

Thereafter, with the object loaded on the omni-directional vehicles 20, motion may be provided, such as single unit manual XYZ position movement at 172, which may include group mode links being active at 174 as described in more detail herein. Additionally, a synchronized Z raise may be performed at 176 (with overload protection) to raise the wing 22 a determined distance from the omni-directional vehicles 20. Additionally, synchronized Z axis offset spars leveling may be performed at 178 to, for example, horizontally level the spars of the wing 22. Additionally, synchronized X axis offset spars straightness aligning may be performed at 180 to align the spar in the X direction. A synchronized XYZ axis offset spars racking may be performed at 182 to correct for any spar racking and a synchronized automatic ABS retract jack move is performed at 184 to move the jacks and position the omni-directional vehicles 20 back on the floor.

With the wing 22 loaded and leveled, synchronized wheel movement position control may be performed at 186. For example, synchronized wheel coordinated movement may be performed at 188 as described herein. Compensation of direction of following units may be performed at 190. For example, leading wing edge omni-directional vehicles 20 (omni-directional vehicles 20 in front of the wing 22 in the direction of travel) may cause following omni-directional vehicles 20 (omni-directional vehicles 20 in back of the wing 22 in the direction of travel) to be controlled and the movements thereof adjusted based on the movement of the leading wing edge omni-directional vehicles 20. For example, based on the programmed sequence of motions, after certain movements by the leading wing edge omni-directional vehicles 20, the following omni-directional vehicles 20 then perform coordinated movement.

Additionally, automatic Z load redistribution may be performed at 192. For example, as described herein, the Z distance between the wing 22 and the omni-directional vehicles 20 may be adjusted to compensate for changes in measured load, such as caused by the uneven floor.

A synchronize XYZ axis offset adjustment may be performed at 194, for example, to adjust for changes in the direction of one or more of the omni-directional vehicles 20. When the wing 22 reaches the destination location, a synchronized automatic floor find jack move 196 and synchronized automatic relift move 198 may be used to position the wing 22, such as by lifting the wheels of the omni-directional vehicles 20 off of the ground to prevent further movement thereof. For example, the jacks (e.g., four jacks) may extend downward below the base 30 (as shown in FIG. 2) of the omni-directional vehicles 20.

Thus, various embodiments provide coordinated movement of an object, such as the wing 22, using a plurality of vehicles, such as the omni-directional vehicles 20, to move the wing 22 without inducing load or minimizing or reducing the induced load.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or concurrently or simultaneously. Additionally, in some aspects of the disclosure, not all operations described herein need be performed.

Figure 9:
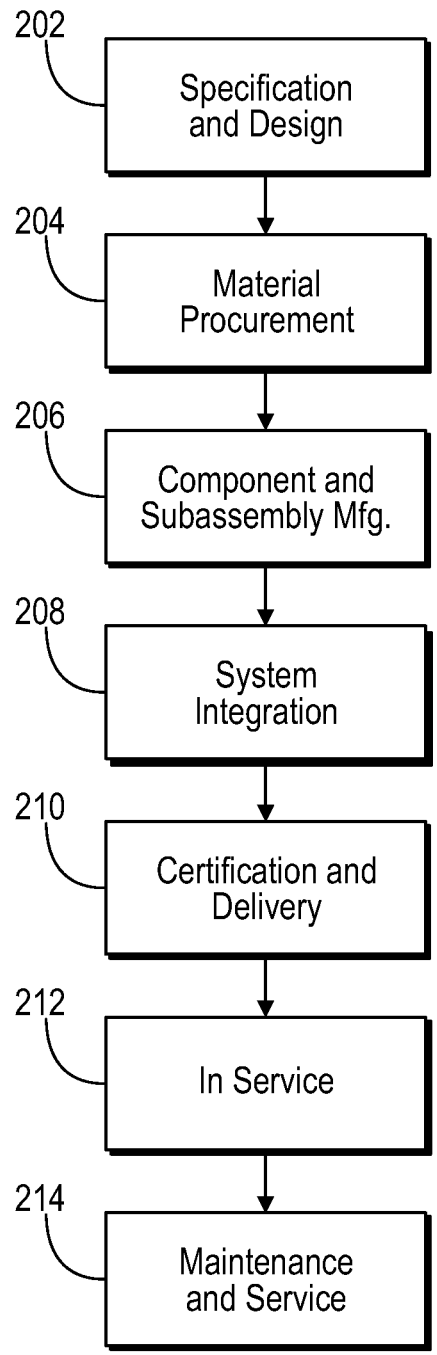
FIG. 9 is a flow diagram of aircraft production and service methodology.
Figure 10:
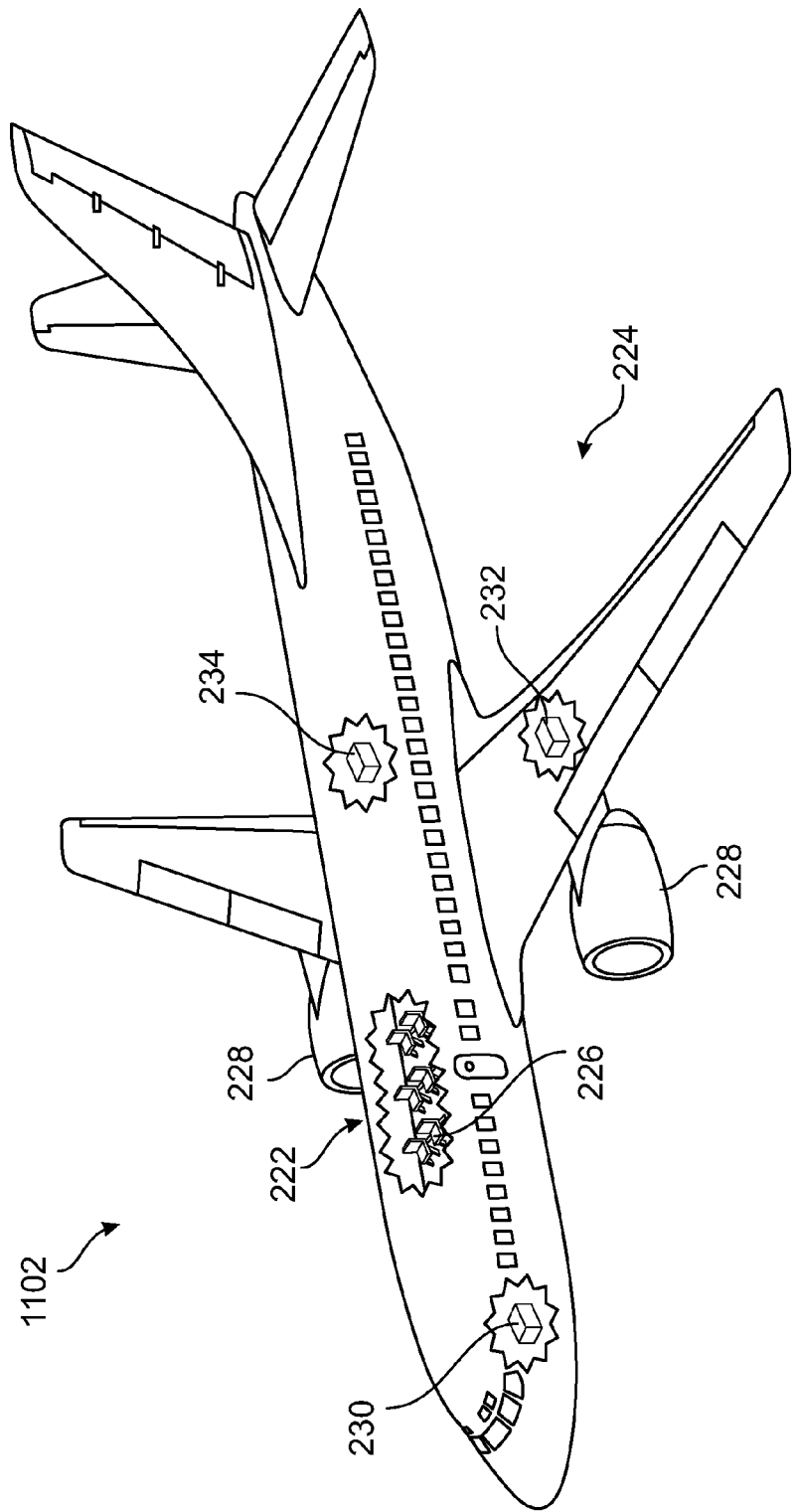
FIG. 10 is a schematic illustration of an aircraft.

Examples of the disclosure may be described in the context of an aircraft manufacturing and service method 200 as shown in FIG. 9 and an aircraft 220 as shown in FIG. 10. During pre-production, illustrative method 200 may include specification and design 202 of the aircraft 220 and material procurement 204. During production, component and subassembly manufacturing 206 and system integration 208 of the aircraft 220 take place. Thereafter, the aircraft 220 may go through certification and delivery 210 to be placed in service 212. While in service by a customer, the aircraft 220 is scheduled for routine maintenance and service 214 (which may also include modification, reconfiguration, refurbishment, and so on).

Each of the processes of the illustrative method 200 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, the aircraft 220 produced by the illustrative method 200 may include an airframe 222 with a plurality of high-level systems 224 and an interior 226. Examples of high-level systems 224 include one or more of a propulsion system 228, an electrical system 230, a hydraulic system 232, and an environmental system 234. Any number of other systems may be included. Although an aerospace example is shown, the principles of the various embodiments may be applied to other industries, such as the automotive industry.

Apparatus and methods shown or described herein may be employed during any one or more of the stages of the manufacturing and service method 200. For example, components or subassemblies corresponding to component and subassembly manufacturing 206 may be fabricated or manufactured in a manner similar to components or subassemblies produced while the aircraft 220 is in service. Also, one or more aspects of the apparatus, method, or combination thereof may be utilized during the production states 208 and 210, for example, by substantially expediting assembly of or reducing the cost of an aircraft 220. Similarly, one or more aspects of the apparatus or method realizations, or a combination thereof, may be utilized, for example and without limitation, while the aircraft 220 is in service, e.g., maintenance and service 214.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

It should be noted that the particular arrangement of components (e.g., the number, types, placement, or the like) of the illustrated embodiments may be modified in various alternate embodiments. In various embodiments, different numbers of a given module, system, or unit may be employed, a different type or types of a given module, system, or unit may be employed, a number of modules, systems, or units (or aspects thereof) may be combined, a given module, system, or unit may be divided into plural modules (or sub-modules), systems (or sub-systems) or units (or sub-units), a given module, system, or unit may be added, or a given module, system or unit may be omitted.

It should be noted that the various embodiments may be implemented in hardware, software or a combination thereof. The various embodiments and/or components, for example, the modules, systems, or components and controllers therein, also may be implemented as part of one or more computers or processors. The computer or processor may include a computing device, an input device, a display unit, and an interface. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," "system", and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module", "system", or "computer."

The computer, module, system, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, system, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs, systems, or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A system for moving an object along a floor, the system comprising:
    a plurality of vehicles configured to support the object, each of the vehicles comprising omni-directional wheels and a height adjusting device, wherein at least one of the plurality of vehicles comprises at least one load sensor to measure a load of the object on the at least one vehicle, and wherein the plurality of vehicles are configured to adjust the height at which the object is supported based on the load of the object measured by the at least one load sensor; and
    a control system in communication with the plurality of vehicles, the control system configured to transmit a signal to the plurality of vehicles instructing the plurality of vehicles to move the object in a predetermined direction along the floor, wherein each of the plurality of vehicles is configured to adjust a direction of movement using the omni-directional wheels and a height at which the object is supported while moving the object in the predetermined direction using the height adjusting device.

2. The system of claim 1, wherein one or more of the plurality of vehicles comprises a communication device to at least one of communicate with the control system or communicate with one or more of others ones of the plurality of vehicles.

3. The system of claim 1, wherein each of the plurality of vehicles comprises a support member configured to couple to the object, the support member being rotatable.

4. The system of claim 1, wherein the control system comprises a human-machine interface (HMI) configured to receive one or more user inputs.

5. The system of claim 1, wherein at least one of the plurality of vehicles comprises a support member and at least one encoder to determine a position of the support member.

6. The system of claim 1, wherein each of the plurality of vehicles comprises at least one location sensor to determine the location of each of the plurality of vehicles.

7. The system of claim 1, wherein the object is an aircraft part.

8. The system of claim 1, wherein the predetermined direction comprises a non-linear motion path, and one or more of the plurality of vehicles is configured to operate semi-independently of one or more of other ones of the plurality of vehicles to move the object along the non-linear motion path.

9. The system of claim 8, wherein the one or more of the plurality of vehicles is configured to at least one of move at a different speed or different adjusted turn angle than the other ones of the plurality of vehicles.

10. A method for moving an object along a floor, the method comprising:
    determining a direction of movement of the object along the floor;
    communicating a signal to a plurality of vehicles supporting the object on the floor, the signal causing the plurality of vehicles to move the object in the direction of movement that is determined, each of the plurality of vehicles comprising omni-directional wheels;
    measuring a load of the object on one or more of the plurality of vehicles; and automatically adjusting (i) a direction of movement of the plurality of vehicles based on the signal that is communicated and (ii) a height at which the object is supported above the floor based on the measured load on one or more of the plurality of vehicles, while the object is moved in the direction of movement that is determined.

11. The method of claim 10, further comprising receiving physical geometry information and placement information for the plurality of vehicles and calculating a motion path for the plurality of vehicles based on the physical geometry information and placement information to move the object in the direction of movement that is determined.

12. The method of claim 11, wherein each of the plurality of vehicles performs one of a plurality of local motions to maintain a course on the motion path.

13. The method of claim 12, further comprising communicating a signal to at least some of the plurality of vehicles to fix at least one of the plurality of local motions.

14. The method of claim 10, further comprising communicating data between the plurality of vehicles.

15. The method of claim 10, further comprising adjusting a rotational position of least one of the plurality of vehicles.

16. A system for moving an object along a floor, the system comprising:
a plurality of vehicles configured to support the object, each of the vehicles comprising omni-directional wheels and a height adjusting device, wherein at least one of the plurality of vehicles comprises at least one load sensor to measure a load of the object on the at least one vehicle, and wherein the plurality of vehicles are configured to adjust the height at which the object is supported based on the load of the object measured by the at least one load sensor; and
a control system in communication with the plurality of vehicles, the control system configured to transmit a signal to the plurality of vehicles instructing the plurality of vehicles to move the object in a predetermined direction, wherein each of the plurality of vehicles is configured to adjust a direction of movement using the omni-directional wheels and adjust a height at which the object is supported using the height adjusting device and while moving the part in the predetermined direction independent of the control system, wherein the height is adjusted based on a changing contour of the floor.

17. The system of claim 16, wherein each of the plurality of vehicles is configured to adjust a direction of movement to maintain the object moving along the predetermined direction.

18. The system of claim 16, wherein the plurality of vehicles are configured to communicate data therebetween.

19. The system of claim 16, wherein at least one of the plurality of vehicles comprises a vertical support having a rotation slip plane in two axes.

20. The system of claim 1, wherein each of the omni-directional wheels is moveable and rotatable in any direction.

21. The method of claim 1, wherein each of the omni-directional wheels is moveable and rotatable in any direction.

22. The system of claim 16, wherein each of the omni-directional wheels is moveable and rotatable in any direction.

* * * * *